(12) United States Patent
Söllner

(10) Patent No.: US 7,872,942 B2
(45) Date of Patent: Jan. 18, 2011

(54) METHOD FOR IMAGING A SEA-SURFACE REFLECTOR FROM TOWED DUAL-SENSOR STREAMER DATA

(75) Inventor: Walter Söllner, Oslo (NO)

(73) Assignee: PGS Geophysical AS, Lysaker (NO)

( * ) Notice: Subject to any disclaimer, the term of this patent is extended or adjusted under 35 U.S.C. 154(b) by 254 days.

(21) Appl. No.: 12/287,789

(22) Filed: Oct. 14, 2008

(65) Prior Publication Data

US 2010/0091610 A1  Apr. 15, 2010

(51) Int. Cl.
*G01V 1/38* (2006.01)

(52) U.S. Cl. .......................................... 367/24; 367/21

(58) Field of Classification Search .................... 367/21, 367/24

See application file for complete search history.

(56) References Cited

U.S. PATENT DOCUMENTS

| 5,835,451 | A | 11/1998 | Soubaras |
| 6,529,445 | B1 | 3/2003 | Laws |
| 7,123,543 | B2 * | 10/2006 | Vaage et al. ................... 367/24 |
| 7,768,869 | B2 * | 8/2010 | van den Berg et al. ......... 367/24 |
| 2007/0214663 | A1 | 9/2007 | Pica |
| 2008/0089174 | A1 | 4/2008 | Sollner et al. |

OTHER PUBLICATIONS

Lasse Amundsen, Tage Rosten, Johan O.A. Robertsson, Ed Kragh; "Rough-sea deghosting of streamer seismic data using pressure gradient approximations"; (2005); Geophysics, vol. 70, No. 1, pp. V1-V9.

Jon F. Claerbout; "Seismic Data Processing with the Wave Equation"; (1976); Fundamentals of Geophysical Data Processing, Chapter 11; pp. 227-263.

Jeno Gazdag; "Wave equation migration with the phase-shift method"; (1978); Geophysics, vol. 43, No. 7, pp. 1342-1351.

Johan O.A. Robertsson, Ed Kragh; "Rough-sea deghosting using a single streamer and a pressure gradient approximation"; (2002); Geophysics, vol. 67, No. 6; pp. 2005-2011.

Joerg Schleicher, Jesse Costa, Amelia Novais; A comparison of imaging conditions for wave-equation shot-profile migration; (2007); SEG Expanded Abstract; pp. 1445-1449.

J.T. Fokkema, P.M van den Berg; "Seismic Applications of Acoustic Reciprocity"; (1993); Elsevier, Chapter 10 "Wavefield Decomposition", pp. 199-213.

* cited by examiner

*Primary Examiner*—Ian J Lobo
(74) *Attorney, Agent, or Firm*—E. Eugene Thigpen; Charles R. Schweppe

(57) ABSTRACT

A pressure wavefield and a normal velocity wavefield measured on a smoothly shaped acquisition surface by towed dual-sensor marine seismic streamers are decomposed into up-going and down-going pressure and particle velocity components on an observation level between the acquisition surface and a sea surface of undetermined shape. The up-going and down-going pressure and particle velocity components are extrapolated iteratively in steps from the observation level toward the sea surface. An image point and a reflection coefficient of the sea surface at the image point are determined from the iteratively extrapolated up-going and down-going pressure and particle velocity components.

11 Claims, 5 Drawing Sheets

METHOD FOR IMAGING A SEA-SURFACE REFLECTOR FROM TOWED DUAL-SENSOR STREAMER DATA

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine seismic data processing with dual-sensor towed streamers. Specifically, the invention is a method for imaging the sea-surface reflector.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in time or depth.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source. In an air gun array, each air gun typically stores and quickly releases a different volume of highly compressed air, forming a short-duration impulse.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers is towed behind a seismic vessel.

When the air-gun array is fired, an impulse sound wave travels down through the water and into the earth. At each interface where the type of rock changes, a portion of that sound wave is reflected back toward the surface and back into the water layer. After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure waves. The pressure waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation of the pressure wave occurs at frequencies for which the propagation distance between the detecting hydrophone and the water surface is equal to one-half wavelength. Maximum amplification occurs at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation occurs at a frequency of about 107 Hz and maximum amplification occurs at a frequency of about 54 Hz.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

It is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal. The sea-surface topography and reflection coefficient are needed parameters for many signal enhancement and reflector imaging techniques, such as receiver and source deghosting, water-layer multiple attenuation, and surface-related multiple modeling.

Thus, a need exists for a method for determining the topography and reflection coefficient of a sea-surface of undetermined shape from towed dual-sensor streamer data acquired on a smoothly shaped acquisition surface in a marine environment.

BRIEF SUMMARY OF THE INVENTION

The invention is a method for imaging a sea-surface reflector from towed dual-sensor streamer data acquired on an arbitrary smooth surface. A pressure wavefield and a normal velocity wavefield measured on a smoothly shaped acquisition surface by towed dual-sensor marine seismic streamers are decomposed into up-going and down-going pressure and particle velocity components on an observation level between the acquisition surface and a sea surface of undetermined shape. The up-going and down-going pressure and particle velocity components are extrapolated iteratively in steps from the observation level toward the sea surface. An image point and a reflection coefficient of the sea surface at the image point are determined from the iteratively extrapolated up-going and down-going pressure and particle velocity components.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for imaging the reflector at a sea surface of undetermined shape by extrapolating towed dual-sensor streamer data acquired on a smoothly shaped surface in a marine environment. The present invention employs a multi-part method to determine the topography and the sea-surface reflection coefficient. First, the invention decomposes the wavefield as recorded by receivers on an acquisition surface into its up-going and down-going components on a flat observation level. Second, the invention extrapolates the up-going and down-going wavefields iteratively in steps from the observation level upwards toward the sea surface. Third, the invention calculates the image point and reflection coefficient of the sea surface at the image point from the iteratively extrapolated up-going and down-going wavefields.

The particle velocity wavefield is commonly acquired using motion sensors, such as geophones or accelerometers, and the pressure wavefield is commonly acquired using pressure sensors, such as hydrophones. These collocated motion and pressure sensors are typically spaced regularly at discrete positions inside a plurality of streamer cables, which together form an acquisition surface. This acquisition surface ideally is a horizontal plane with the motion sensors pointing in the positive direction of the z-axis, which by convention is downward, and thus sensing the vertical velocity wavefield $v_z$.

Figure 1A:
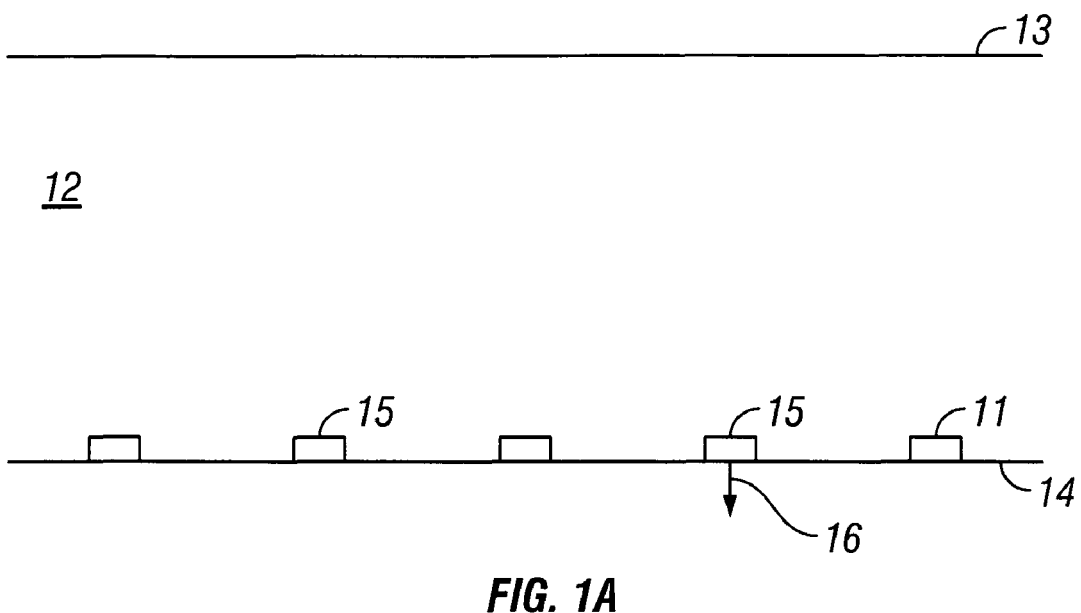
FIG. 1A is a schematic view of an ideal marine environment.

FIG. 1A is a schematic view (not drawn to scale) of an ideal marine environment. FIG. 1A shows a perspective view of towed marine streamers 11 in a body of water 12 under a sea surface 13. The towed streamers 11 form an acquisition surface 14. In the ideal state illustrated in FIG. 1A, both the water surface 13 and the acquisition surface 14 are flat, that is, horizontal planes. The motion sensors 15 in the streamers 11 forming the acquisition plane 14 are sensing in the vertical z-direction 16. Thus, the motion sensors 15 are sensing a vertical velocity wavefield $v_z$.

However, a flat acquisition surface 14 is an idealization. In a more realistic marine environment, the acquisition surface 14 is not necessarily flat. Due to the activity of sea currents and marginal weather conditions, the towed streamers 11 forming the acquisition surface 14 may change their shape and the motion sensors would sense a velocity wavefield that is normal to the acquisition surface, $v_n$.

Figure 1B:
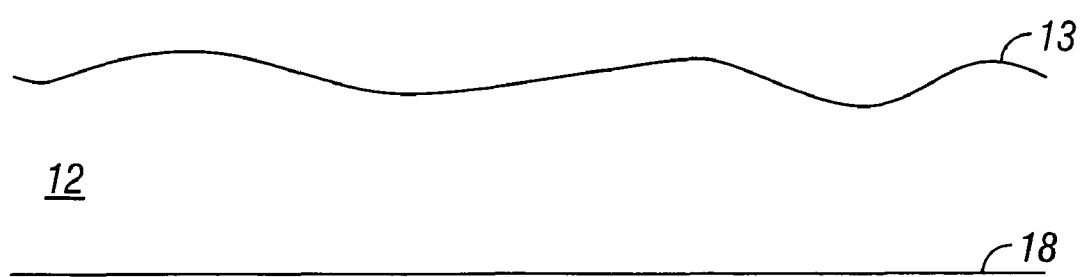
FIG. 1B is a schematic view of a realistic marine environment in which the invention could be practiced.

FIG. 1B is a schematic view (not drawn to scale) of a realistic marine environment in which the invention could be practiced. As in FIG. 1A, FIG. 1B shows a perspective view of the towed marine streamers 11 in the body of water 12 under the sea surface 13. In the more realistic state illustrated in FIG. 1B, both the sea surface 13 and the acquisition surface 14 are no longer necessarily horizontal planes. The sea surface 13 is of undetermined shape and the acquisition surface 14 is smoothly shaped. The motion sensors 15 in the streamers 11 forming the acquisition surface 14 are sensing in a direction normal 17 to the acquisition surface 14. Thus, the motion sensors 15 are sensing a normal velocity wavefield $v_n$. A normal vector $n=(n_x,n_y,n_z)$ will designate a unit vector pointing in the direction normal 17 to the acquisition surface 14. An arbitrary flat observation level 18 is positioned between the acquisition surface 14 and the sea surface 13.

By properly combining the normal velocity wavefield and the pressure wavefield of a smoothly shaped acquisition surface formed by towed streamers, the invention decomposes the wavefields on an arbitrarily-chosen flat observation level into up-going and down-going pressure wavefields and particle velocity wavefields. This generalized wavefield decomposition approach is model-independent and reduces to conventional wavefield decomposition if the acquisition surface is planar.

Figure 2:
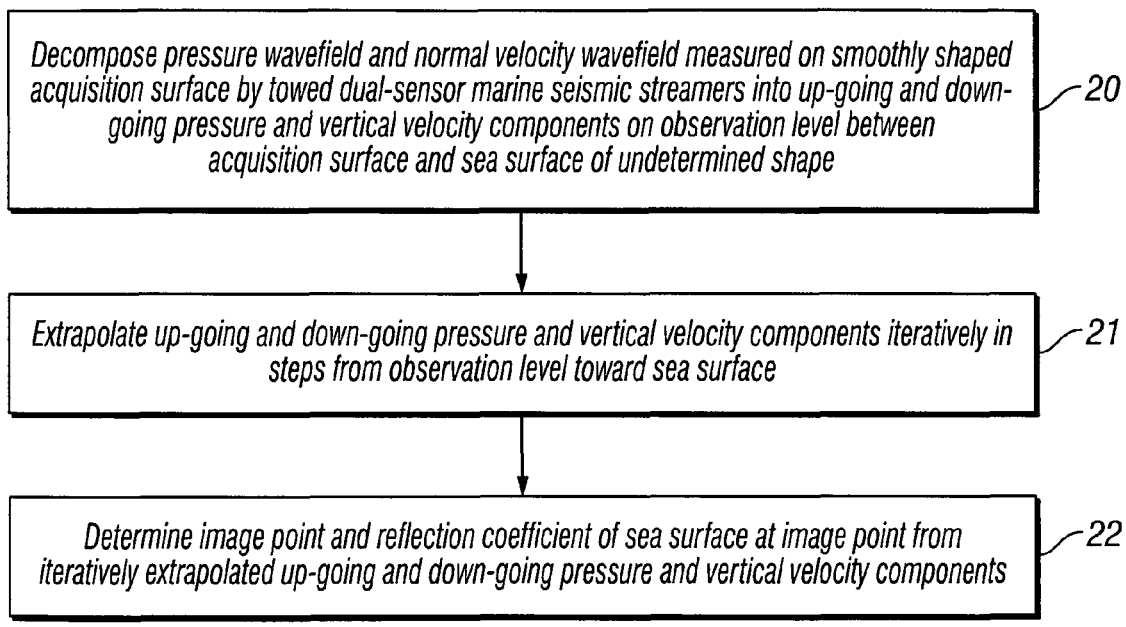
FIG. 2 is a flowchart illustrating an embodiment of the invention for imaging the sea-surface reflector from towed dual-sensor streamer data.

FIG. 2 is a flowchart illustrating an embodiment of the invention for imaging the sea-surface reflector from towed dual-sensor streamer data acquired on an arbitrary smooth acquisition surface.

At block 20, a pressure wavefield and a normal velocity wavefield measured on a smoothly shaped acquisition surface by towed dual-sensor marine seismic streamers are decomposed into up-going and down-going pressure and particle velocity components on an observation level between the acquisition surface and a sea surface of undetermined shape.

At block 21, the up-going and down-going pressure and vertical velocity components from block 20 are extrapolated iteratively in steps from the observation level toward the sea surface.

At block 22, an image point and a reflection coefficient of the sea surface at the image point are determined from the iteratively extrapolated up-going and down-going pressure and vertical velocity components from block 21.

Figure 3:
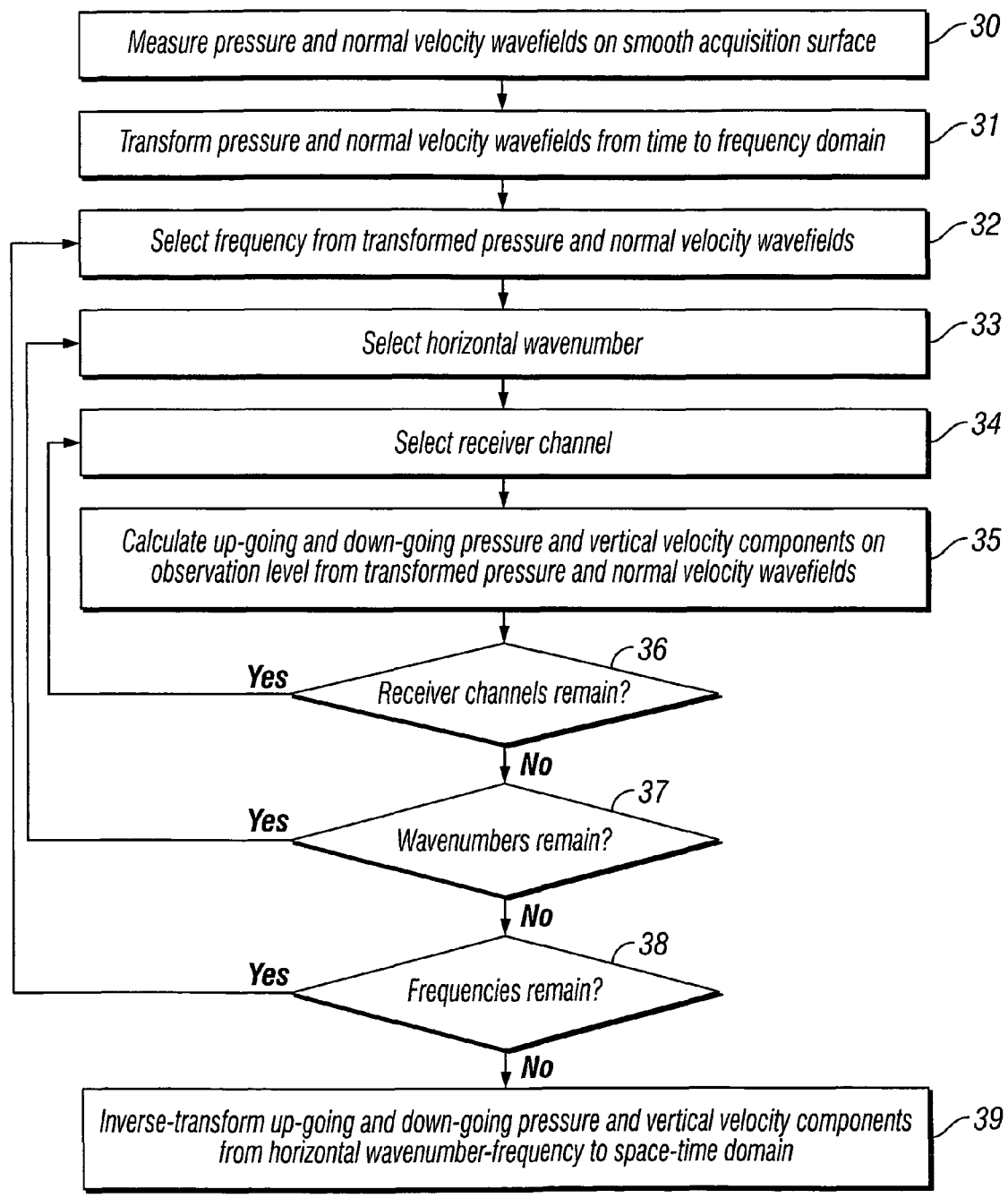
FIG. 3 is a flowchart illustrating an embodiment of the invention for decomposing pressure and normal velocity wavefields into up-going and down-going components.

FIG. 3 is a flowchart illustrating an embodiment of the invention for decomposing pressure and normal velocity wavefields into up-going and down-going components. This flowchart describes in more detail how to accomplish the decomposition described more generally in block 20 in FIG. 2, above. Thus, FIG. 3 details how to decompose a pressure wavefield and a normal velocity wavefield measured on a smoothly-shaped acquisition surface by towed dual-sensor marine seismic streamers into up-going and down-going pressure and particle velocity components on an observation level between the acquisition surface and a sea surface of undetermined shape.

At block 30, a pressure wavefield $p(x,z^R,t)$ and a normal velocity wavefield $v_n(x,z^R,t)$ are measured on an arbitrary smoothly-shaped acquisition surface in a marine environment. In one contemplated embodiment, the wavefields are measured by seismic sensors mounted in a plurality of towed dual-sensor seismic streamers. The seismic sensors mounted in seismic streamers form the acquisition surface, which is smoothly-shaped but not necessarily flat. The depth $z^R$ of the acquisition surface is thus a smoothly-varying function of horizontal coordinates x and y, not a constant as a horizontal plane would be.

Usually, the pressure wavefield is measured by a hydrophone and the velocity wavefield is measured by a geophone. However, it is within the scope of the invention that other types of seismic sensors be employed in the invention. The other types of seismic sensors could include, but are not limited to, multi-directional particle velocity sensors (such as geophones), particle displacement sensors, particle acceleration sensors, or pressure gradient sensors being used in place of or in addition to vertical particle velocity sensors.

The invention employs particle motion sensors that are responsive to motions in the particles of the medium to which the motion sensors are coupled, typically water. In general, particle motion sensors may be responsive to the displacement of the particles, the velocity of the particles, or the acceleration of the particles in the medium. Particle velocity sensors are typically employed and so are used to illustrate the present invention. If motion sensors are used which are responsive to acceleration (such as accelerometers), then the acceleration signal is preferably integrated to convert it to a velocity signal, by computational means well known in the art. If motion sensors are used which are responsive to position, then the position signal is preferably differentiated to convert it to a velocity signal, by computational means well known in the art.

At block 31, the pressure wavefield $p(x,z^R,t)$ and the normal velocity wavefield $v_n(x,z^R,t)$ measured in block 30 are transformed from the space-time domain to $P(x,z^R,\omega)$ and $V_n(x,z^R,\omega)$, respectively, in the space-frequency domain, where $\omega=2\pi F$ is angular frequency for frequency f. The transform used is preferably a Fast Fourier Transform (FFT) for computational efficiency, although use of this transform is not a limitation of the invention. Here, the convention will be followed of showing variables in the space-time domain in lower-case letters, while showing transformed variables in upper-case letters.

In the embodiment of the invention illustrated here, an up-going pressure wavefield is decomposed by a calculation using the transformed pressure and normal velocity wavefields. This decomposition calculation is done for each combination of appropriate frequencies, horizontal wavenumbers, and receiver channels.

At block 32, a frequency $\omega$ is selected from available frequencies in the transformed pressure wavefield $P(x,z^R,\omega)$ and normal velocity wavefield $V_n(x,z^R,\omega)$. The frequency selection is preferably done in a systematic manner, for computational efficiency, although systematic selection is not a limitation of the invention.

At block 33, a horizontal wavenumber $k_x$ is selected from available horizontal wavenumbers. The horizontal wavenumber selection is preferably done in a systematic manner, for computational efficiency, although systematic selection is not a limitation of the invention.

At block 34, a receiver channel m is selected from available receiver channels. The channel selection is preferably done in a systematic manner, for computational efficiency, although systematic selection is not a limitation of the invention.

At block 35, the up-going and down-going pressure and vertical velocity components are calculated on an arbitrary observation level from the transformed pressure wavefield $P(x,z^R,\omega)$ and the transformed normal velocity wavefield $V_n(x,z^R,\omega)$ from block 31 at the frequency $\omega$ selected in block 32 and the horizontal wavenumber $k_x$ selected in block 33 in FIG. 3. These calculations are described in more detail in the discussion accompanying the flowchart in FIG. 5, below.

At block 36, it is determined if additional receiver channels m remain. If additional channels remain, then the process returns to block 34 to select another channel. If no channels remain, then the process continues to the next block.

At block 37, it is determined if additional horizontal wavenumbers $k_x$ remain. If additional horizontal wavenumbers remain, then the process returns to block 33 to select another horizontal wavenumber. If no horizontal wavenumbers remain, then the process continues to the next block.

At block 38, it is determined if additional frequencies $\omega$ remain. If additional frequencies remain, then the process returns to block 32 to select another frequency. If no frequencies remain, then the process continues to the next block.

At this point, up-going and down-going pressure wavefields $P^{up}(k_x,z^{obs},\omega)$ and $P^{down}(k_x,z^{obs},\omega)$, respectively, at the observation level and up-going and down-going vertical velocity wavefields $V_z^{up}(k_x,z^{obs},\omega)$ and $V_z^{down}(k_x,z^{obs},\omega)$, respectively, at the observation level have been calculated in block 35 for individual frequencies $\omega$, horizontal wavenumbers $k_x$, and receiver channels m then and summed over blocks 32-38.

At block 39, the up-going and down-going pressure and vertical velocity components at the observation level are inverse-transformed from the horizontal wavenumber-frequency domain to the space-time domain. In one embodiment, this inverse transform is applied in two steps, although the invention is not restricted to this embodiment.

First, the up-going and down-going pressure wavefields $P^{up}(k_x,z^{obs},\omega)$ and $P^{down}(k_x,z^{obs},\omega)$, respectively, at the observation level and the up-going and down-going vertical velocity wavefields $V_z^{up}(k_x,z^{obs},\omega)$ and $V_z^{down}(k_x,z^{obs},\omega)$, respectively, at the observation level from block 35 are inverse-transformed from the horizontal wavenumber-frequency domain to $P^{up}(x,z^{obs},\omega)$, $P^{down}(x,z^{obs},\omega)$, $V_z^{up}(x,z^{obs},\omega)$, and $V_z^{down}(x,z^{obs},\omega)$, respectively, in the space-frequency domain. The inverse transform used is preferably an Inverse Fast Fourier Transform (IFFT) for computational efficiency, although use of this inverse transform is not a limitation of the invention.

Second, the up-going and down-going pressure wavefields $P^{up}(x,z^{obs},\omega)$ and $P^{down}(x,z^{obs},\omega)$, respectively, at the observation level and the up-going and down-going vertical velocity wavefields $V_z^{up}(x,z^{obs},\omega)$ and $V_z^{down}(x,z^{obs},\omega)$, respectively, at the observation level from block 35 are inverse-transformed from the space-frequency domain to $p^{up}(x,z^{obs},t)$, $p^{down}(x,z^{obs},t)$, $v_z^{up}(x,z^{obs},t)$, and $v_z^{down}(x,z^{obs},t)$, respectively, in the space-time domain. The inverse transform used is preferably an Inverse Fast Fourier Transform (IFFT) for computational efficiency, although use of this inverse transform is not a limitation of the invention.

Figure 4:
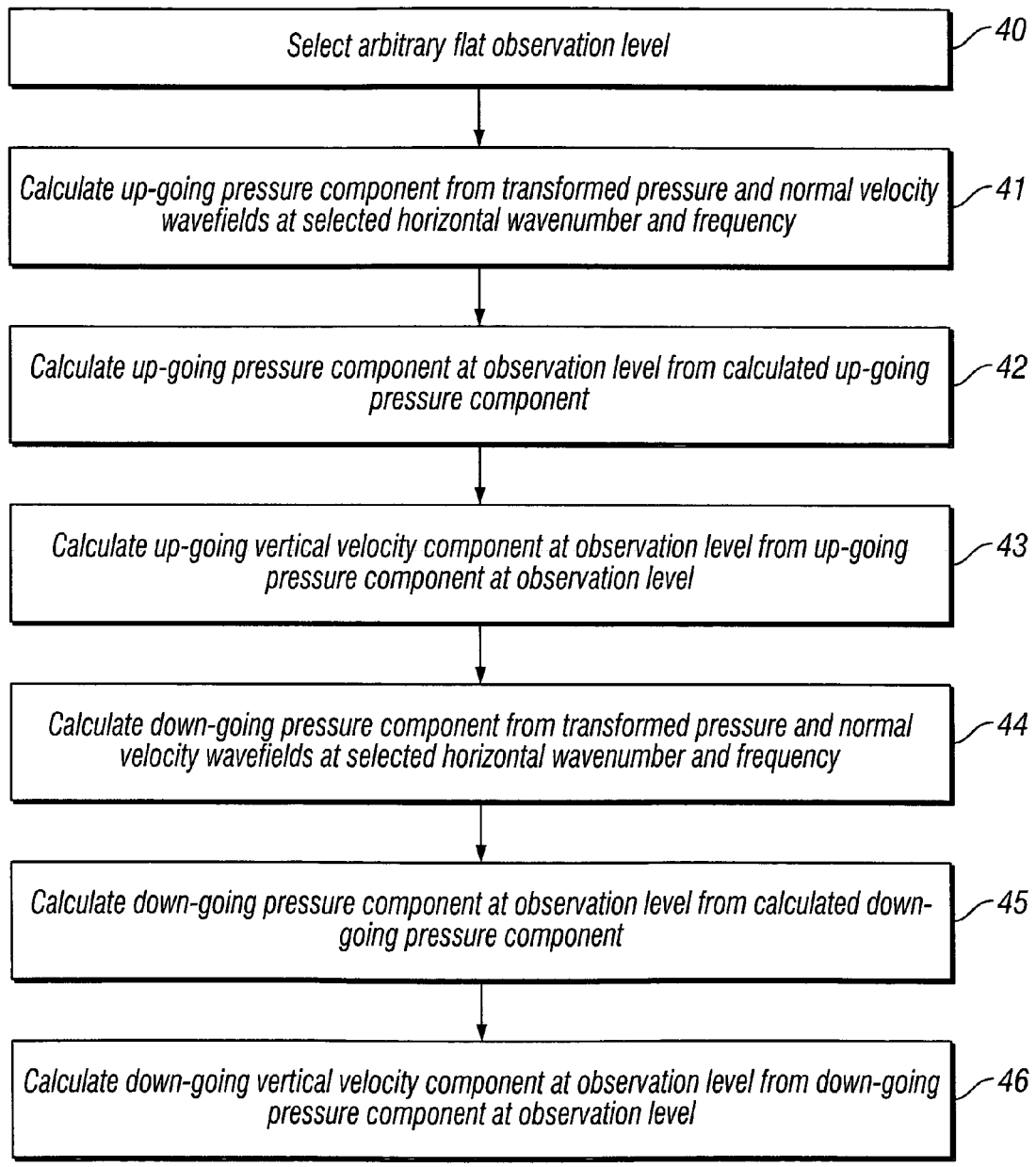
FIG. 4 is a flowchart illustrating an embodiment of the invention for decomposing pressure and particle velocity wavefields recorded on an acquisition surface into up-going and down-going components on an observation level.

FIG. 4 is a flowchart illustrating an embodiment of the invention for decomposing pressure and particle velocity wavefields recorded on an acquisition surface into up-going and down-going components on an observation level. This flowchart describes in more detail how to accomplish the decomposition described more generally in block 35 in FIG. 3, above.

At block 40, an arbitrary flat observation level with constant depth $z^{obs}$ is selected between the acquisition surface and the sea surface, which are both not necessarily flat.

At block 41, an up-going pressure component $P^{up}(k_x,z=0,\omega)$ at depth $z=0$ is calculated from the transformed pressure wavefield $P(x,z^R,\omega)$ and the transformed normal velocity wavefield $V_n(x,z^R,\omega)$ from block 31 at the frequency c selected in block 32 and the horizontal wavenumber $k_x$ selected in block 33 in FIG. 3. Recall that the sea surface is a surface of undetermined shape and not necessarily the horizontal plane defined by depth $z=0$. In one embodiment, the up-going pressure component $P^{up}(k_x,z=0,\omega)$ is calculated by applying the following equation:

$$P^{up}(k_x, z=0, \omega) = \qquad (1)$$

$$\frac{\Delta x}{-2jk_z}\sum_m \{j\omega\rho V_n(m\Delta x, z_m^R, \omega)\exp[jk_x m\Delta x - jk_z z_m^R] +$$

$$P(m\Delta x, z_m^R, \omega)\exp[jk_x m\Delta x - jk_z z_m^R][jk_x n_x - jk_z n_z]\}.$$

Here $k_x$ is the horizontal wavenumber in the x-direction, typically the inline direction of the towed streamers; $\Delta x$ is the interval between receivers in the x-direction; j is the imaginary unit $\sqrt{-1}$; and $k_z$ is the vertical wavenumber in the z-direction, given by:

$$k_z = \sqrt{\left(\frac{\omega}{c}\right)^2 - k_x^2},$$

where c is speed of sound in water. Continuing in Equation (1), m is the receiver channel number selected in block 34 in FIG. 3, $\rho$ is density of the medium, $z^R_m$ is the depth at the $m^{th}$ receiver, $n_x$ is the x-component of the normal vector n, and $n_z$ is the z-component of the normal vector n. The 3D version of the wavefield separation in Equation (1) is obtained straightforwardly by extending the summation into y-direction (crossline direction of the towed streamer) and by replacing the vertical wavenumber with:

$$k_z = \sqrt{\left(\frac{\omega}{c}\right)^2 - k_x^2 - k_y^2}.$$

Here, and in the following equations, the 2D versions only are presented because it gives a clear insight while preserving all the main features of the method of the invention.

At block 42, an up-going pressure component $P^{up}(k_x,z^{obs},\omega)$ at the observation level selected in block 40 is calculated from the up-going pressure component $P^{up}(k_x,z=0,\omega)$ calculated using Equation (1) in block 41. In one embodiment, the up-going pressure component $P^{up}(k_x,z^{obs},\omega)$ is calculated by applying the following equation:

$$P^{up}(k_x,z^{obs},\omega)=P^{up}(k_x,z=0,\omega)\exp[jk_z z^{obs}]. \qquad (2)$$

At block 43, an up-going vertical velocity component $V_z^{up}(k_x,z^{obs},\omega)$ at the observation level selected in block 42 is calculated from the up-going pressure component $P^{up}(k_x,$ $z^{obs}$,ω) at the arbitrary observation level with depth $z^{obs}$ calculated using Equation (2) in block 42. In one embodiment, the up-going vertical velocity component $V_z^{up}(k_x,z^{obs},\omega)$ is calculated by applying the following equation:

$$V_z^{up}(k_x, z^{obs}, \omega) = \frac{-k_z}{\rho\omega} P^{up}(k_x, z^{obs}, \omega). \quad (3)$$

At block 44, a down-going pressure component $P^{down}(k_x, z=0, \omega)$ is calculated from the transformed pressure wavefield $P(x,z^R,\omega)$ and the transformed normal velocity wavefield $V_n(x,z^R,\omega)$ from block 31 at the frequency ω selected in block 32 and the horizontal wavenumber $k_x$ selected in block 33 in FIG. 3. In one embodiment, the down-going pressure component $P^{down}(k_x,z=0,\omega)$ is calculated by applying the following equation:

$$P^{down}(k_x, z=0, \omega) = \quad (4)$$
$$\frac{\Delta x}{2jk_z}\sum_m\{j\omega\rho V_n(m\Delta x, z_m^R, \omega)\exp[jk_x m\Delta x + jk_z z_m^R] +$$
$$P(m\Delta x, z_m^R, \omega)\exp[jk_x m\Delta x + jk_z z_m^R][jk_x n_x + jk_z n_z]\}.$$

At block 45, a down-going pressure component $P^{down}(k_x, z^{obs},\omega)$ at the observation level selected in block 40 is calculated from the down-going pressure component $P^{down}(k_x, z=0,\omega)$ calculated using Equation (4) in block 44. In one embodiment, the down-going pressure component $P^{down}(k_x, z^{obs},\omega)$ is calculated by applying the following equation:

$$P^{down}(k_x,z^{obs},\omega)=P^{down}(k_x,z=0,\omega)\exp[-jk_z z^{obs}]. \quad (5)$$

At block 46, a down-going vertical velocity component $V_z^{down}(k_x,z^{obs},\omega)$ at the observation level selected in block 40 is calculated from the down-going pressure component $P^{down}(k_x,z^{obs},\omega)$ at the arbitrary observation level with depth $z^{obs}$ calculated using Equation (5) in block 45. In one embodiment, the down-going vertical velocity component $V_z^{down}(k_x, z^{obs},\omega)$ is calculated by applying the following equation:

$$V_z^{down}(k_x, z^{obs}, \omega) = \frac{k_z}{\rho\omega} P^{down}(k_x, z^{obs}, \omega). \quad (6)$$

Figure 5:
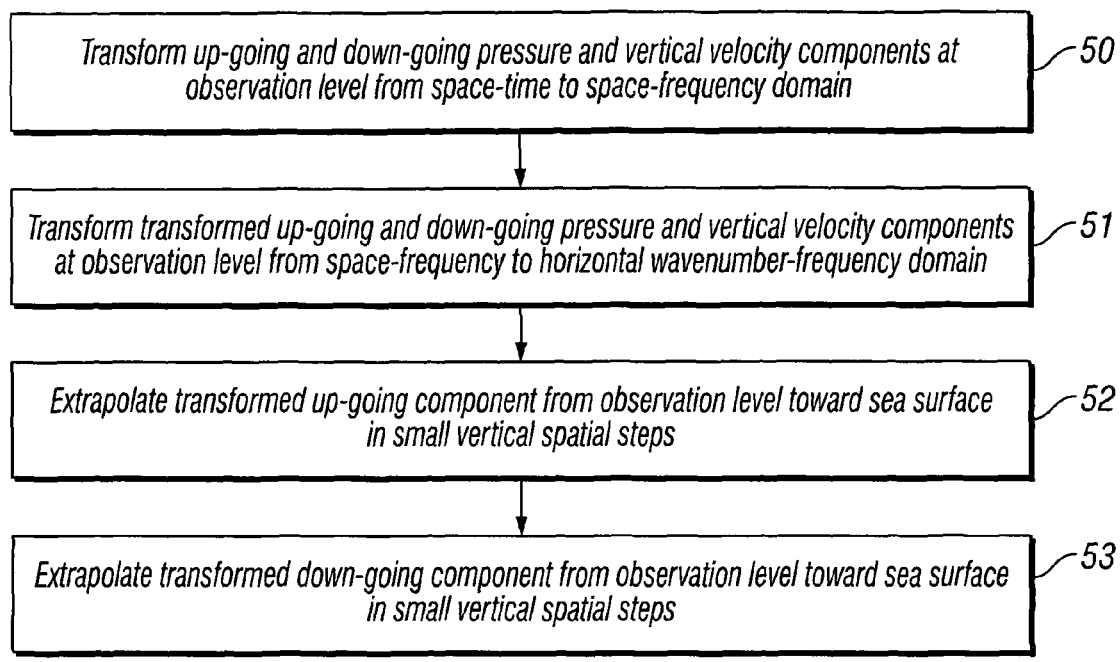
FIG. 5 is a flowchart illustrating an embodiment of the invention for extrapolating up-going and down-going pressure and particle velocity components from the observation level to the sea surface.

Imaging consists of two steps: wavefield continuation (extrapolation) and imaging condition application. FIG. 5 is a flowchart illustrating an embodiment of the invention for extrapolating up-going and down-going pressure and particle velocity components iteratively in steps from the observation level to the sea surface. This flowchart describes in more detail how to accomplish the extrapolation described more generally in block 21 in FIG. 2, above. The extrapolation is commonly calculated in the frequency-wavenumber domain and is done so here, but for illustrative purposes only. The wavefields can be propagated in other domains and the selection of the frequency-wavenumber domain is not intended as a restriction of the invention.

At block 50, the up-going pressure wavefield $p^{up}(x,z^{obs},t)$ at the observation level and the up-going vertical velocity wavefield $v_z^{up}(x,z^{obs},t)$ at the observation level from block 39 in FIG. 3 are transformed from the space-time domain to $P^{up}(x,z^{obs},\omega)$ and $V_z^{up}(x,z^{obs},\omega)$, respectively, in the space-frequency domain. The transform used is preferably a Fast Fourier Transform (FFT) for computational efficiency, although use of this transform is not a limitation of the invention.

At block 51, the up-going pressure wavefield $P^{up}(x,z^{obs},\omega)$ at the observation level and the up-going vertical velocity wavefield $V_z^{up}(x,z^{obs},\omega)$ at the observation level from block 50 are transformed from the space-time domain to $P^{up}(k_x, z^{obs},\omega)$ and $V_z^{up}(k_x,z^{obs},\omega)$, respectively, in the frequency-wavenumber domain. The transform used is preferably a Fast Fourier Transform (FFT) for computational efficiency, although use of this transform is not a limitation of the invention.

At block 52, an up-going wavefield from block 51 is iteratively extrapolated in small vertical spatial steps from the observation level at depth $z^{obs}$ upwards through the water layer toward the sea-surface. The up-going wavefield is extrapolated forward in time. In one example embodiment, it is the up-going pressure wavefield $P^{up}(k_x,z^{obs},\omega)$ from block 51 that is extrapolated from the observation level upwards toward the sea-surface. In one particular embodiment, the up-going pressure wavefield is extrapolated from a depth at $z^{obs}$ to a depth at z by applying the following equation:

$$P^{up}(k_x,z,\omega)=P^{up}(k_x,z^{obs},\omega)\exp[-jk_z(z^{obs}-z)] \quad (7)$$

Similarly, in another embodiment, it could be the up-going vertical velocity $V_z^{up}(k_x,z^{obs},\omega)$ wavefield from block 51 that is iteratively extrapolated from the observation level upwards toward the sea-surface by applying the following equation:

$$V_z^{up}(k_x,z,\omega)=V_z^{up}(k_x,z^{obs},\omega)\exp[-jk_z(z^{obs}-z)]. \quad (8)$$

At block 53, a down-going wavefield from block 51 is iteratively extrapolated in small vertical spatial steps from the observation level at depth $z^{obs}$ upwards through the water layer toward the sea-surface. The down-going wavefield is extrapolated backward in time. In one example embodiment, the down-going pressure wavefield $P^{down}(k_x,z^{obs},\omega)$ from block 51 is iteratively extrapolated from the observation level upwards toward the sea-surface. In one example embodiment, the down-going pressure wavefield is extrapolated from a depth at $z^{obs}$ to a depth at z by applying the following equation:

$$P^{down}(k_x,z,\omega)=P^{down}(k_x,z^{obs},\omega)\exp[jk_z(z^{obs}-z)] \quad (9)$$

Similarly, in the other embodiment, it could be the down-going vertical velocity wavefield $V_z^{down}(k_x,z^{obs},\omega)$ from block 51 that is iteratively extrapolated from the observation level upwards toward the sea-surface by applying the following equation:

$$V_z^{down}(k_x,z,\omega)=V_z^{down}(k_x,z^{obs},\omega)\exp[jk_z(z^{obs}-z)]. \quad (10)$$

Figure 6:
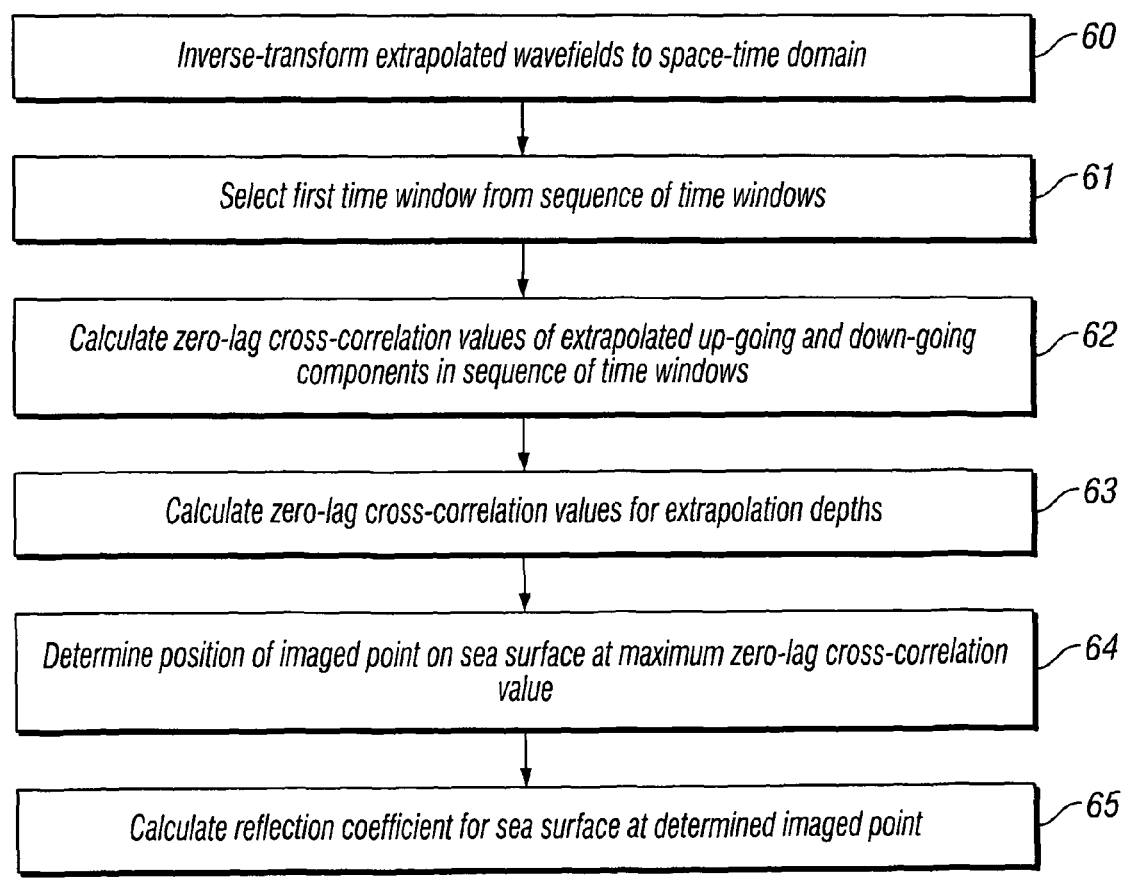
FIG. 6 is a flowchart illustrating an embodiment of the invention for determining an image and a reflection coefficient of the sea surface from iteratively extrapolated up-going and down-going pressure and particle velocity components.

FIG. 6 is a flowchart illustrating an embodiment of the invention for determining an image point and a reflection coefficient of the sea surface at the image point from iteratively extrapolated up-going and down-going pressure and particle velocity components by applying an adequate imaging condition. This flowchart describes in more detail how to accomplish the imaging described more generally in block 22 in FIG. 2, above.

At block 60, the iteratively extrapolated up-going pressure and vertical velocity wavefields $P^{up}(k_x,z,\omega)$ and $V_z^{up}(k_x,z,\omega)$ from block 52 in FIG. 5 and the iteratively extrapolated down-going pressure and vertical velocity wavefields $P^{down}(k_x,z,\omega)$ and $V_z^{down}(k_x,z,\omega)$ from block 53 in FIG. 5 are inverse-transformed from the horizontal wavenumber-frequency domain to $P^{up}(x,z,\omega)$, $V_z^{up}(x,z,\omega)$, $P^{down}(x,z,\omega)$, and $V_z^{down}(x,z,\omega)$, respectively, in the space-frequency domain. These wavefield are further inverse-transformed from space-frequency domain to $p^{up}(x,z,t)$, $v_z^{up}(x,z,t)$, $p^{down}(x,z,t)$, and $v_z^{down}(x,z,t)$, respectively, in the space-time domain. The inverse transforms used are preferably Inverse Fast Fourier Transform (IFFT) for computational efficiency, although use of these inverse transforms is not a limitation of the invention.

At block 61, a first time window is selected from a sequence of time windows.

At block 62, zero-lag cross-correlation values of the iteratively extrapolated up-going and down-going wavefields from block 60 are calculated in the selected time widows from block 61. In one embodiment, the iteratively extrapolated up-going and down-going pressure wavefields $P^{up}(x,z,\omega)$ and $P^{down}(x,z,\omega)$, respectively, from block 60 are cross-correlated. In this embodiment, the zero-lag value of the cross-correlation $I(x,z,t=0)$, representing the imaged sea surface value for the selected channel position x and extrapolation depth z, is calculated by applying the following equation:

$$I(x, z, t = 0) = \sum_{\omega} P^{down}(x, z, \omega)\overline{P^{up}(x, z, \omega)}, \quad (11)$$

where the bar designates conjugation. Similarly, in another embodiment, the iteratively extrapolated up-going and down-going vertical velocity wavefields $V_z^{up}(x,z,\omega)$ and $V_z^{down}(x,z,\omega)$, respectively, from block 60 are cross-correlated by applying the following equation:

$$I(x, z, t = 0) = -\sum_{\omega} V_z^{down}(x, z, \omega)\overline{V_z^{up}(x, z, \omega)}. \quad (12)$$

At block 63, the calculation of the cross-correlation value at zero time is repeated for all the available extrapolation depths (within a desired predefined depth range) and the imaged sea surface is determined from among the values of $I(x,z,t=0)$ as determined in block 62.

At block 64, the position of the maximum cross-correlation value at zero time determined in block 63 is taken as the image point, of the sea surface. The calculations using the imaging condition in Equations (11) and (12) are robust, but do not give the proper amplitudes, which are the reflection coefficients of the sea surface.

At block 65, the reflection coefficient $R(x,z)$ for the sea-surface is determined at the image point determined in block 64. The reflection coefficient is determined by the division of the extrapolated down-going wavefield by the extrapolated up-going wavefield at the image point determined in block 64. In one embodiment, the reflection coefficient $R(x,z)$ is determined using the extrapolated up-going and down-going pressure wavefields from the following equation:

$$R(x, z) = \frac{\sum_{\omega} P^{down}(x, z, \omega)\overline{P^{down}(x, z, \omega)}}{\sum_{\omega} P^{up}(x, z, \omega)\overline{P^{down}(x, z, \omega)}}. \quad (13)$$

In another embodiment, the reflection coefficient could be calculated in Equation (13) using the corresponding extrapolated down-going and up-going vertical velocity wavefields instead of the pressure wavefields, using the following equation:

$$R(x, z) = -\frac{\sum_{\omega} V_z^{down}(x, z, \omega)\overline{V_z^{down}(x, z, \omega)}}{\sum_{\omega} V_z^{up}(x, z, \omega)\overline{V_z^{down}(x, z, \omega)}}. \quad (14)$$

Thus, the up-going and down-going wavefields are iteratively extrapolated from the observation level located between the acquisition surface and the sea-surface, upwards through the water layer toward the sea-surface. The up-going wavefield is extrapolated forward in time and the down-going wavefield is propagated backwards in time. At every grid point of the model, the invention builds a cross-correlation of the extrapolated wavefields and evaluates the zero-leg value in a sequence of time windows. From one time window a maximum cross-correlation value at zero time is obtained if the two wavefields meet at the reflection (image) point. The reflection coefficient for the sea-surface is given by the division of the cross-correlation of the down-going wavefield and the up-going wavefield by the autocorrelation of the up-going wavefield at time zero.

If the sea-surface were a fixed surface, then one imaging would apply to the entire recording time. As the sea-surface is changing in time, one imaging condition applies solely in a limited time window of the extrapolated wavefields. From the sliding window correlation analysis of block 61 of FIG. 6 applied to different iterative extrapolation steps, the invention extracts the time-variant behavior of one image point. The superposition of all the image points of one particular record resembles the sea-surface state of that corresponding acquisition window.

Typical applications of the invention include, but are not limited to, multiple prediction methods which require the sea-surface reflector, such as, for example, water-layer peg-leg modeling and surface-related multiple modeling. The advantage of multiple modeling increases when the recorded seismic data are too coarsely-sampled to give proper multiple predictions using convolution. By using the sea-surface reflector, the invention could extend the imaged reflector illumination procedure described in Pica's U.S. Patent Application with Publication No. US 2007/0214663 A1, "Seismic Processing for the Elimination of Multiple Reflections". In the illumination step of Pica, the present invention could then additionally apply a surface illumination using these surface images. The Pica patent application relies on a flat surface model with reflection coefficient equal to the ideal value of −1.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for imaging a sea-surface reflector from towed dual-sensor streamer data, comprising:

decomposing a pressure wavefield and a normal velocity wavefield measured on a smoothly shaped acquisition surface by towed dual-sensor marine seismic streamers into up-going and down-going pressure and vertical velocity components on an observation level between the acquisition surface and a sea surface of undetermined shape;

extrapolating the up-going and down-going pressure and vertical velocity components iteratively in steps from the observation level toward the sea surface; and determining an image point and a reflection coefficient of the sea surface at the image point from the iteratively extrapolated up-going and down-going pressure and vertical velocity components.

2. The method of claim 1, wherein the decomposing a pressure wavefield and a normal velocity wavefield comprises:

transforming the pressure and normal velocity wavefields from space-time domain to space-frequency domain;

performing the following for each frequency:
  performing the following for each horizontal wavenumber:
    performing the following for each receiver channel:
      calculating up-going and down-going pressure and vertical velocity components at the observation level in the horizontal wavenumber-frequency domain from the transformed pressure normal velocity wavefields;

inverse-transforming the calculated up-going pressure wavefield at the observation level and the calculated up-going vertical velocity wavefield at the observation level from the horizontal wavenumber-frequency domain to the space-frequency domain; and inverse-transforming the inverse-transformed up-going pressure wavefield at the observation level and the inverse-transformed up-going vertical velocity wavefield at the observation level from the space-frequency domain to the space-time domain.

3. The method of claim 2, wherein the calculating up-going and down-going pressure and vertical velocity wavefields comprises:

calculating an up-going pressure wavefield in the horizontal wavenumber-frequency domain from the transformed pressure wavefield and the transformed normal velocity wavefield;

calculating an up-going pressure wavefield at the observation level from the calculated up-going pressure wavefield; and calculating an up-going vertical velocity wavefield at the observation level from the calculated up-going pressure wavefield at the observation level;

calculating an down-going pressure wavefield in the horizontal wavenumber-frequency domain from the transformed pressure wavefield and the transformed normal velocity wavefield;

calculating an down-going pressure wavefield at the observation level from the calculated down-going pressure wavefield; and calculating an down-going vertical velocity wavefield at the observation level from the calculated down-going pressure wavefield at the observation level.

4. The method of claim 3, wherein the calculating an up-going pressure wavefield $P^{up}(k_x, z=0, \omega)$ in the horizontal wavenumber-frequency domain from the transformed pressure wavefield $P(x, z^R, \omega)$ and the transformed normal velocity wavefield $V_n(x, z^R, \omega)$ comprises applying the following equation:

$$P^{up}(k_x, z=0, \omega) = \frac{\Delta x}{-2jk_z} \sum_m \{j\omega\rho V_n(m\Delta x, z_m^R, \omega)\exp[jk_x m\Delta x - jk_z z_m^R] + P(m\Delta x, z_m^R, \omega)\exp[jk_x m\Delta x - jk_z z_m^R][jk_x n_x - jk_z n_z]\}.$$

where $k_x$ is the horizontal wavenumber in the x-direction, $\Delta x$ is the interval between receivers in the x-direction, $k_z$ is the vertical wavenumber in the z-direction, m is the receiver channel number, $\rho$ is density of the medium, $z_m^R$ is the depth at the $m^{th}$ receiver, $n_x$ is the x-component of the normal vector n, and $n_z$ is the z-component of the normal vector n.

5. The method of claim 4, wherein the calculating an up-going pressure wavefield at the observation level comprises applying the following equation:

$$P^{up}(k_x, z^{obs}, \omega) = P^{up}(k_x, z=0, \omega)\exp[jk_z z^{obs}].$$

6. The method of claim 5, wherein the calculating an up-going vertical velocity wavefield at the observation level comprises applying the following equation:

$$V_z^{up}(k_x, z^{obs}, \omega) = \frac{-k_z}{\rho\omega} P^{up}(k_x, z^{obs}, \omega).$$

7. The method of claim 3, wherein the calculating a down-going pressure wavefield $P^{down}(k_x, z=0, \omega)$ in the horizontal wavenumber-frequency domain from the transformed pressure wavefield $P(x, z^R, \omega)$ and the transformed normal velocity wavefield $V_n(x, z^R, \omega)$ comprises applying the following equation:

$$P^{down}(k_x, z=0, \omega) = \frac{\Delta x}{2jk_z} \sum_m \{j\omega\rho V_n(m\Delta x, z_m^R, \omega)\exp[jk_x m\Delta x + jk_z z_m^R] + P(m\Delta x, z_m^R, \omega)\exp[jk_x m\Delta x + jk_z z_m^R][jk_x n_x + jk_z n_z]\},$$

where $k_x$ is the horizontal wavenumber in the x-direction, $\Delta x$ is the interval between receivers in the x-direction, $k_z$ is the vertical wavenumber in the z-direction, m is the receiver channel number, $\rho$ is density of the medium, $z_m^R$ is the depth at the $m^{th}$ receiver, $n_x$ is the x-component of the normal vector n, and $n_z$ is the z-component of the normal vector n.

8. The method of claim 7, wherein the calculating a down-going pressure wavefield at the observation level comprises applying the following equation:

$$P^{down}(k_x, z^{obs}, \omega) = P^{down}(k_x, z=0, \omega)\exp[-jk_z z^{obs}].$$

9. The method of claim 8, wherein the calculating a down-going vertical velocity wavefield at the observation level comprises applying the following equation:

$$V_z^{down}(k_x, z^{obs}, \omega) = \frac{k_z}{\rho\omega} P^{down}(k_x, z^{obs}, \omega).$$

10. The method of claim 1, wherein the extrapolating the up-going and down-going pressure and vertical velocity components comprises:

extrapolating the up-going pressure wavefield component forward in time from the observation level upward toward the sea surface;

extrapolating the down-going pressure wavefield component backward in time from the observation level upward toward the sea surface;

extrapolating the up-going vertical velocity wavefield component forward in time from the observation level upward toward the sea surface; and extrapolating the down-going vertical velocity wavefield component backward in time from the observation level upward toward the sea surface.

11. The method of claim 1, wherein the determining an image and a reflection coefficient of the sea surface comprises:

selecting a sequence of time windows;

calculating a zero-lag value of a cross-correlation of an extrapolated up-going wavefield and an extrapolated down-going wavefield in the sequence of time windows at desired extrapolation depths;

determining a position of an image point on the sea surface as a maximum cross-correlation value of the calculated zero-lag values of cross-correlations of extrapolated up-going and down-going wavefields; and determining the reflection coefficient at the image point on the sea surface by division of the zero-lag value of the cross-correlation of the extrapolated down-going wavefield and extrapolated up-going wavefield by the zero-lag value of the autocorrelation of the extrapolated up-going wavefield at the image point.

* * * * *